US012516739B1

(12) United States Patent
Giourof

(10) Patent No.: US 12,516,739 B1
(45) Date of Patent: Jan. 6, 2026

(54) VALVE PLATE

(71) Applicant: KB Delta, Inc., Torrance, CA (US)

(72) Inventor: Boris Giourof, Torrance, CA (US)

(73) Assignee: KB Delta, Inc., Torrance, CA (US)

( * ) Notice: Subject to any disclaimer, the term of this patent is extended or adjusted under 35 U.S.C. 154(b) by 0 days.

(21) Appl. No.: 18/762,539

(22) Filed: Jul. 2, 2024

(51) Int. Cl.
*F16K 1/42* (2006.01)

(52) U.S. Cl.
CPC .................... *F16K 1/42* (2013.01)

(58) Field of Classification Search
CPC ........................................... F16K 1/42
See application file for complete search history.

(56) References Cited

U.S. PATENT DOCUMENTS

| | | | | |
|---|---|---|---|---|
| 3,536,094 | A * | 10/1970 | Manley, Jr. ............ | F16K 15/08 137/512.1 |
| 5,052,434 | A * | 10/1991 | Bauer .................. | F16K 15/066 137/516.13 |
| 6,510,868 | B2 * | 1/2003 | Penza ................. | F16K 15/1402 137/516.21 |
| 9,702,353 | B2 * | 7/2017 | Spiegl .................... | F16K 15/10 |
| 2004/0016459 | A1 * | 1/2004 | Thompson ............ | F16K 27/003 137/512.1 |
| 2006/0180208 | A1 * | 8/2006 | Walpole .............. | F04B 39/1026 137/528 |

* cited by examiner

*Primary Examiner* — Patrick C Williams
(74) *Attorney, Agent, or Firm* — Foundation Law Group LLP; JD Harriman

(57) ABSTRACT

The present apparatus is a plate valve comprising a plurality of rings with openings therebetween. The rings are coupled together via radial webs. The cross sectional profile of each ring comprises a body having a width that tapers and an upper surface that comprises two sloping planes joining at a point. This results in an inverted V shape of the surface of each ring. This V shape allows reduced turbulence of gas or fluid during operation (e.g., when the plate valve is open).

5 Claims, 8 Drawing Sheets

VALVE PLATE

Valve plates are important components of gas compressors that are responsible for regulating the flow of gas in and out of the compressor cylinders. These plates are typically made of durable materials and are designed with precision to ensure optimal performance. Valve plates work by opening and closing a series of valves that allow gas to flow in and out of the compressor cylinders. This process is critical for maintaining the proper pressure and temperature within the compressor, which is essential for efficient operation and maximum output.

There are several different types of valve plates used in gas compressors, including plate valves, reed valves, poppet valves and ring valves. Valve plates must be carefully designed and manufactured to ensure proper operation and durability. They must be able to withstand high temperatures and pressures, as well as the constant stresses and strains of compression and decompression cycles.

Overall, valve plates are essential components of gas compressors that play a critical role in regulating the flow of gas and maintaining the proper pressure and temperature within the compressor. One prior art type of valve plate is comprised of a plurality of concentrically arranged rings with radial webs connecting the rings together. There are various designs for such rings but each has one or more disadvantages.

The current prior art valve plate designs suffer from turbulence in the gas flow through the valve plate. This can negatively affect performance. Even a small amount of turbulence can be a disadvantage due to the high rates of operation in some gas compressor systems.

SUMMARY

The present apparatus is a plate valve comprising a plurality of rings with openings therebetween. The rings are coupled together via radial webs. The cross sectional profile of each ring comprises a body having a width that tapers and an upper surface that comprises two sloping planes joining at a point. This results in an inverted V shape of the surface of each ring. This V shape allows reduced turbulence of gas or fluid during operation (e.g., when the plate valve is open).

In one embodiment, a valve plate is provided comprising first and second radially spaced concentric sealing rings, each ring providing a circumferential sealing service with a valve seat; each sealing ring having a front face and a back face, the front face having a V-shaped profile in cross section comprising a first sloped surface and a second sloped surface meeting at a peak on the front face of each sealing ring.

In one embodiment, a valve plate is provided wherein the angle of the first and second sloped surface is between 82 and 85 degrees. In one embodiment, a valve plate is provided wherein the peak is between 0.010 and 0.012 inches above a side edge of each sealing ring. In one embodiment, a valve plate is provided wherein the plate is comprised of one of fiber-reinforced plastic, Teflon, and stainless steel.

DETAILED DESCRIPTION OF THE SYSTEM

A compressor valve plate is a crucial component in a reciprocating gas & air compressor. The valve plate in one embodiment is comprised of Fiber Reinforced Plastics or Stainless-Steel plates that cover the intake and exhaust ports of the compressor cylinder. Check Valves have Valve Plates mounted on them which allow air/gas to flow in one direction (intake) and prevent it from flowing back (exhaust).

They ensure the one-way flow of air/gas into and out of the cylinder. Valve have gaskets and seals to ensure an airtight seal between the valve body and the cylinder, for the efficient operation of the compressor.

The valve plate assembly plays a critical role in controlling the flow of compressed air/gas in a reciprocating compressor, contributing to its efficiency and performance. Different types of compressors may have variations in the design and materials used for valve plates, but their fundamental purpose remains the same.

A problem with prior art valve plates is the presence of turbulence around the sealing portion of the valve plate when the valve is open. The turbulence can reduce the required flow through the valve during operation, or could create back pressure that could impact the timing of the closing of the valve during operation.

Figure 1:
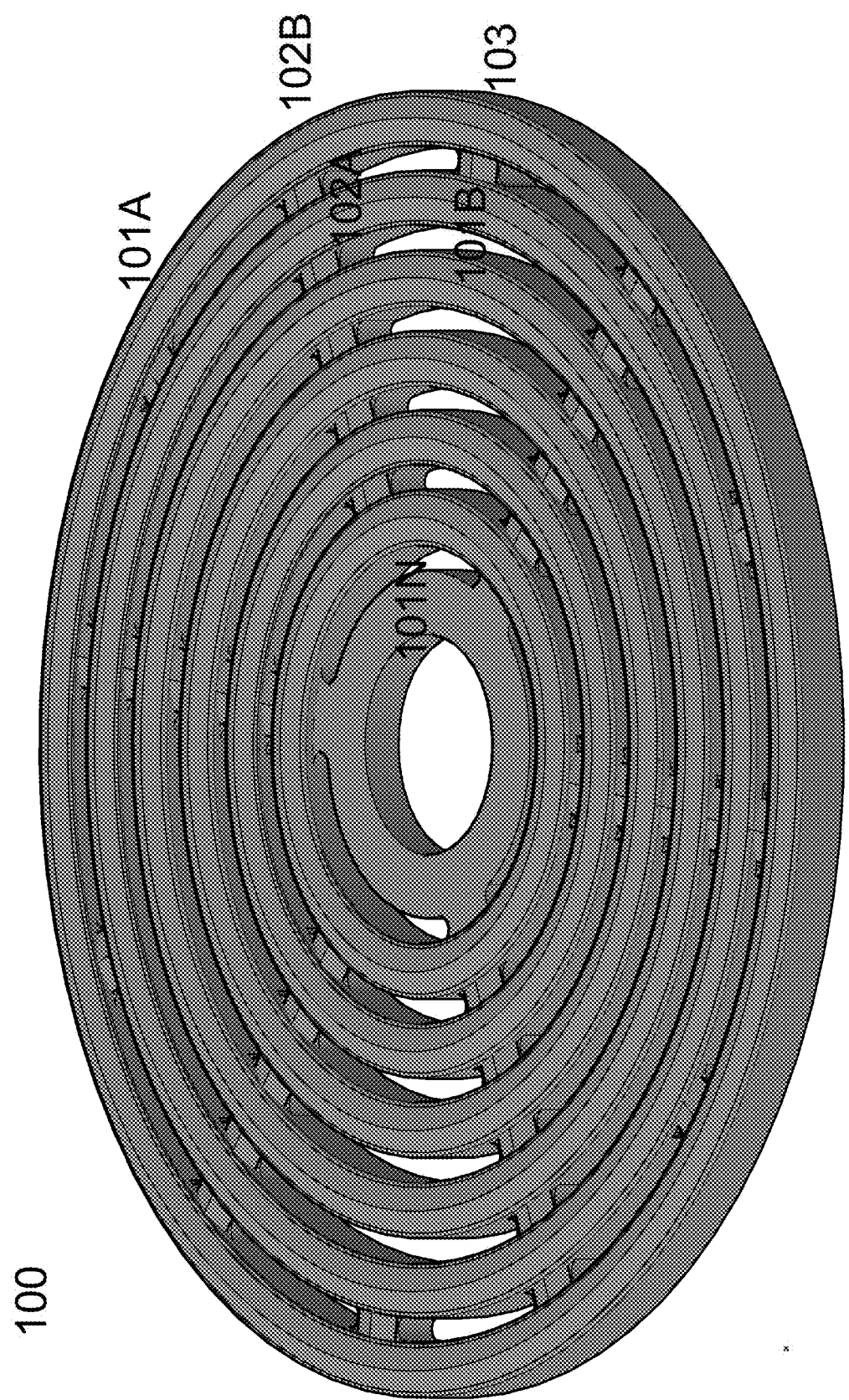
FIG. 1 is a top perspective view of the valve plate in an embodiment.

The present valve plate has a configuration that reduces turbulence around the valve during operation. The valve plate can achieve laminar or turbulence-free flow compared to prior art valve plate profiles. FIG. 1 is a top perspective view of the valve plate in an embodiment. The valve plate comprises a plurality of concentric rings 101A, 101B, through inner ring 101N. The rings each include a first sloped upper surface 102A and a second sloped upper surface 102B, that join at a peak 103. This "V" shaped profile allows improved fluid or gas flow around the valve plate ring during operation. In addition, the web between the rings has a v-shaped profile to further improve fluid or gas flow.

Figure 2:
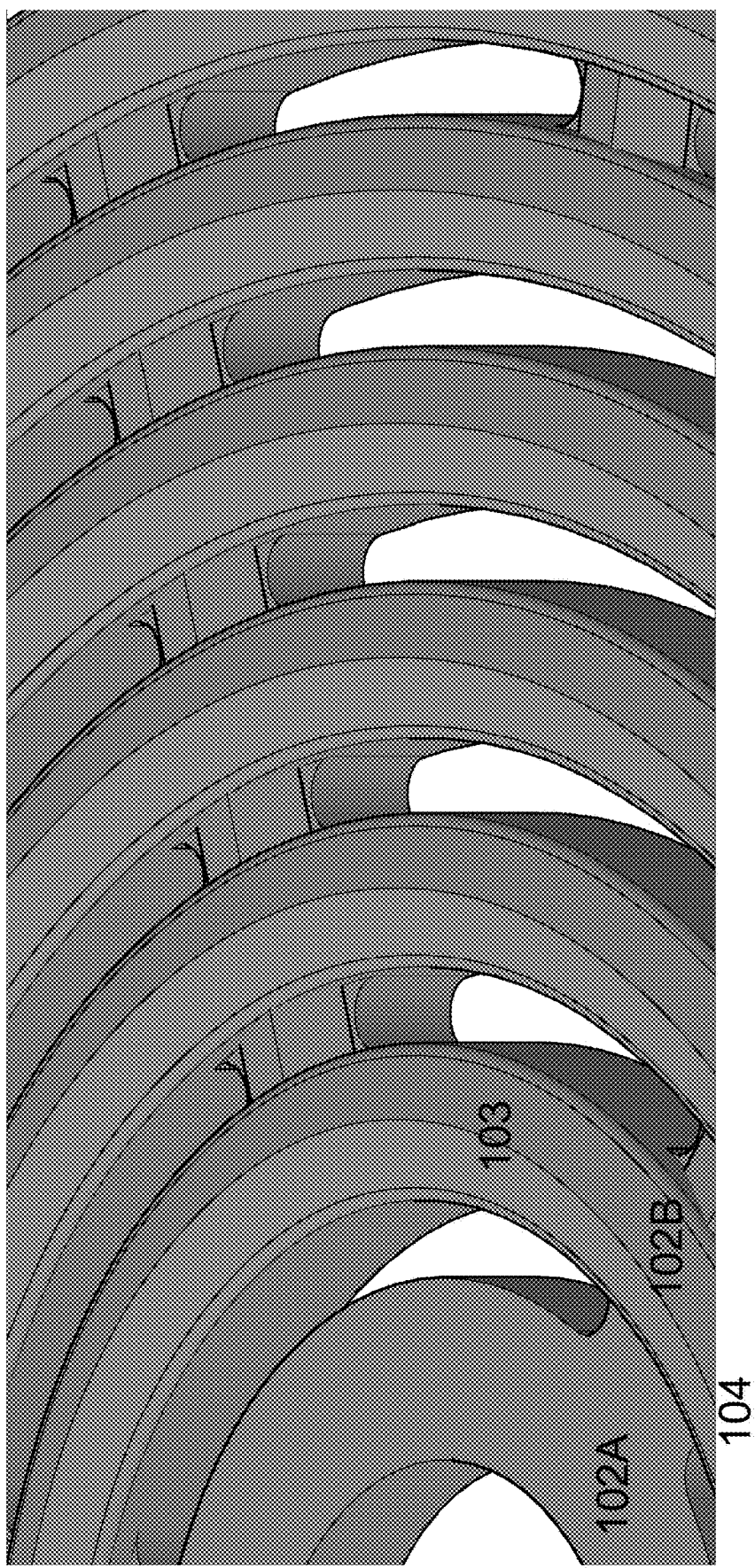
FIG. 2 is a close up view of the valve plate of FIG. 1.
Figure 4:
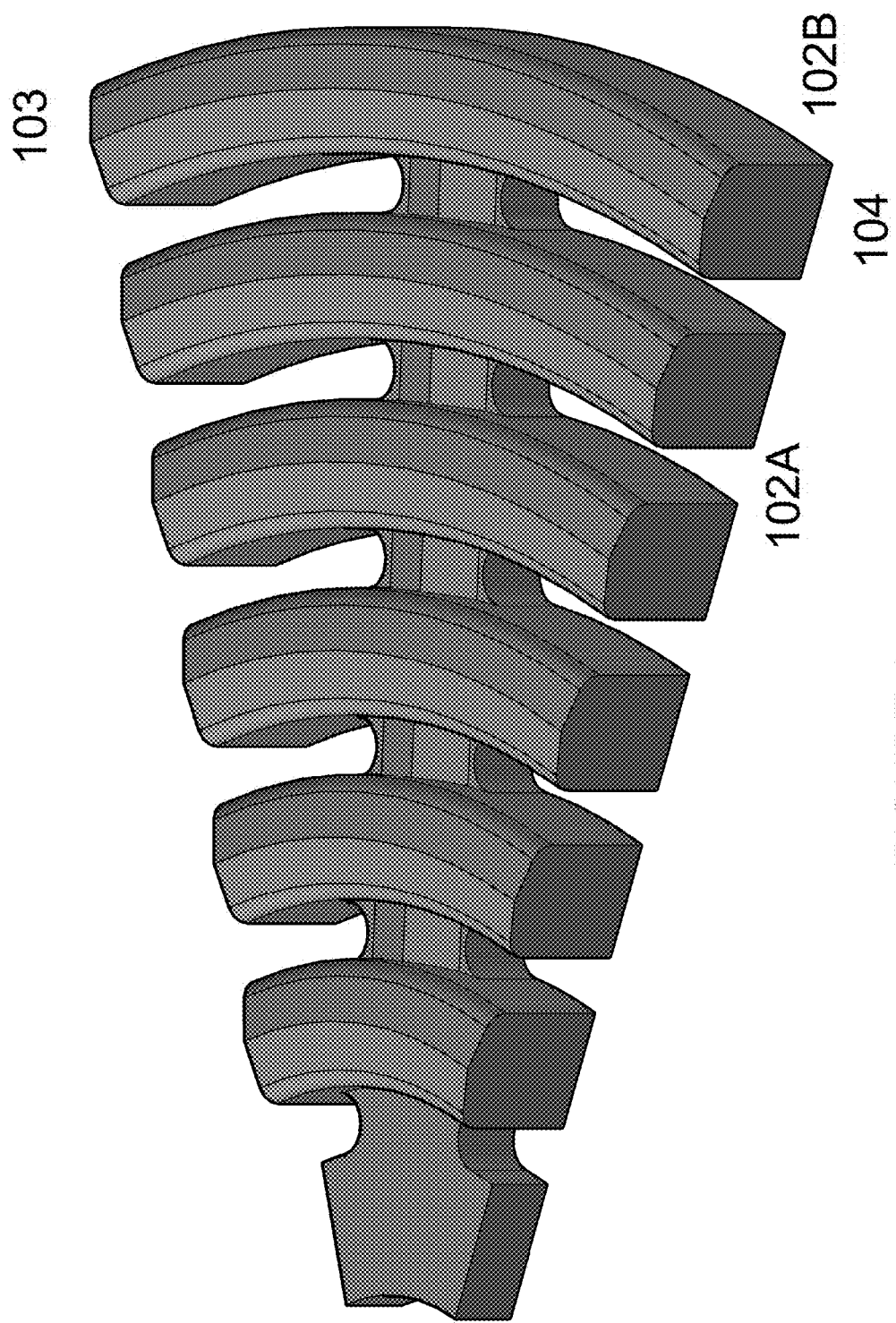
FIG. 4 is a top perspective view of the valve plate of the system.

Referring now to FIG. 2 and FIG. 4, a partial cutaway view of the embodiment of FIG. 1 is shown. The inner sloped upper surfaces 102A and 102B are shown in greater detail. The two surfaces join at peak 103. In one embodiment, each ring has an approximate width of 0.250". The sloped surfaces 102A and 102B have an angle ranging between 82 and 85 degrees with the peak 103 being approximately 0.010" to 0.012" higher than the side edge 104 of each ring.

Figure 3:
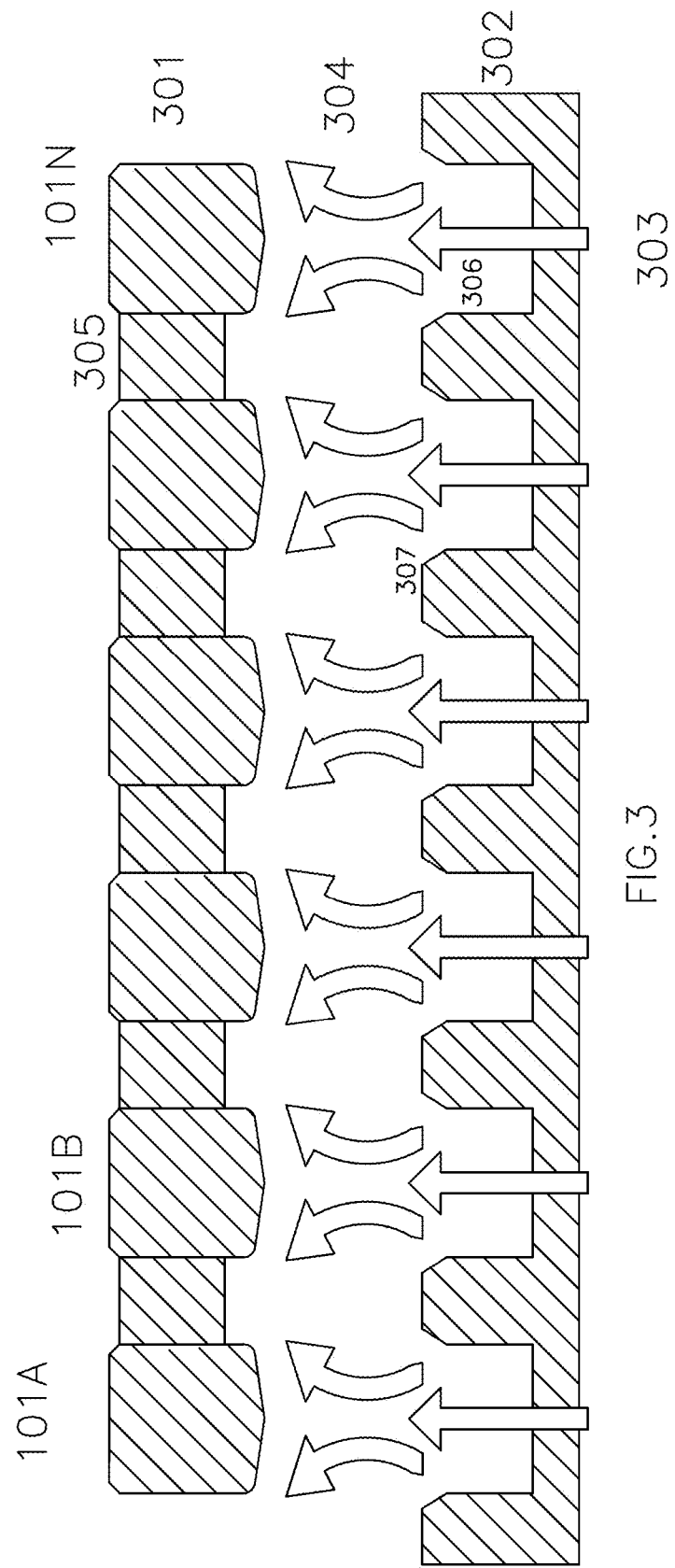
FIG. 3 is a cross sectional view of the valve plate in an embodiment.

FIG. 3 is a cross sectional view of the valve plate in an embodiment. FIG. 3 illustrates the valve plate 301 in an open position, allowing fluid or gas flow. The valve plate 301 is shown above the valve seat 302. In one embodiment, the valve plate may be fiber-reinforced plastic, Teflon, stainless steel, titanium, and the like. The valve seat 302 is comprised of stainless steel, alloy steel, and the like.

As shown in FIG. 3, when the valve plate is in the open position, the flow 303 of fluid or gas comes through valve seat 302 and splits to flow 304 around the valve plate rings 101A, 101B, and 101N and flows 305 through the space between the rings. The flow 304 has minimal turbulence and is nearer to a laminar flow than prior art valve plates.

Figure 5:
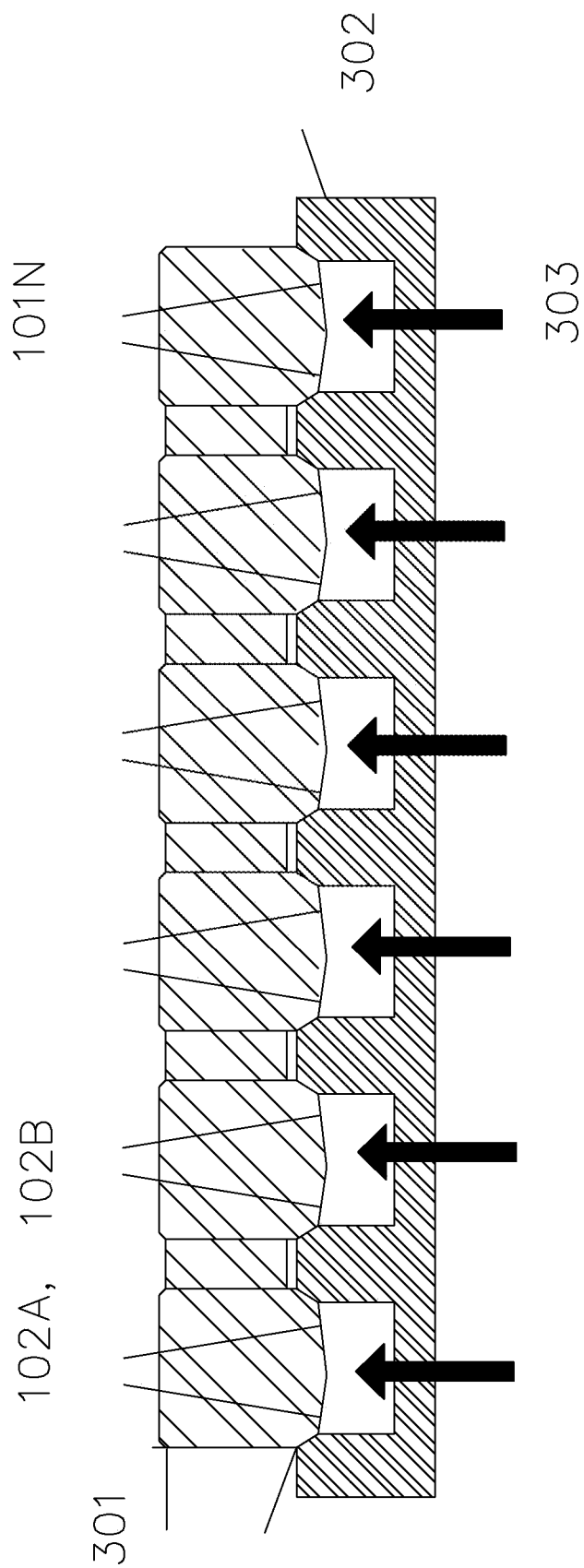
FIG. 5 illustrates the valve plate in a closed position.

In a closed position, as shown in FIG. 5, the rings 101 engage the tapered edges of the valve seat 302 at recessed regions 303. When closed, there is space in between the surface of the ring and the bottom of the opening 303. The valve plate 301 in the closed position prevents the flow of gas or fluid through the assembly.

Figure 6:
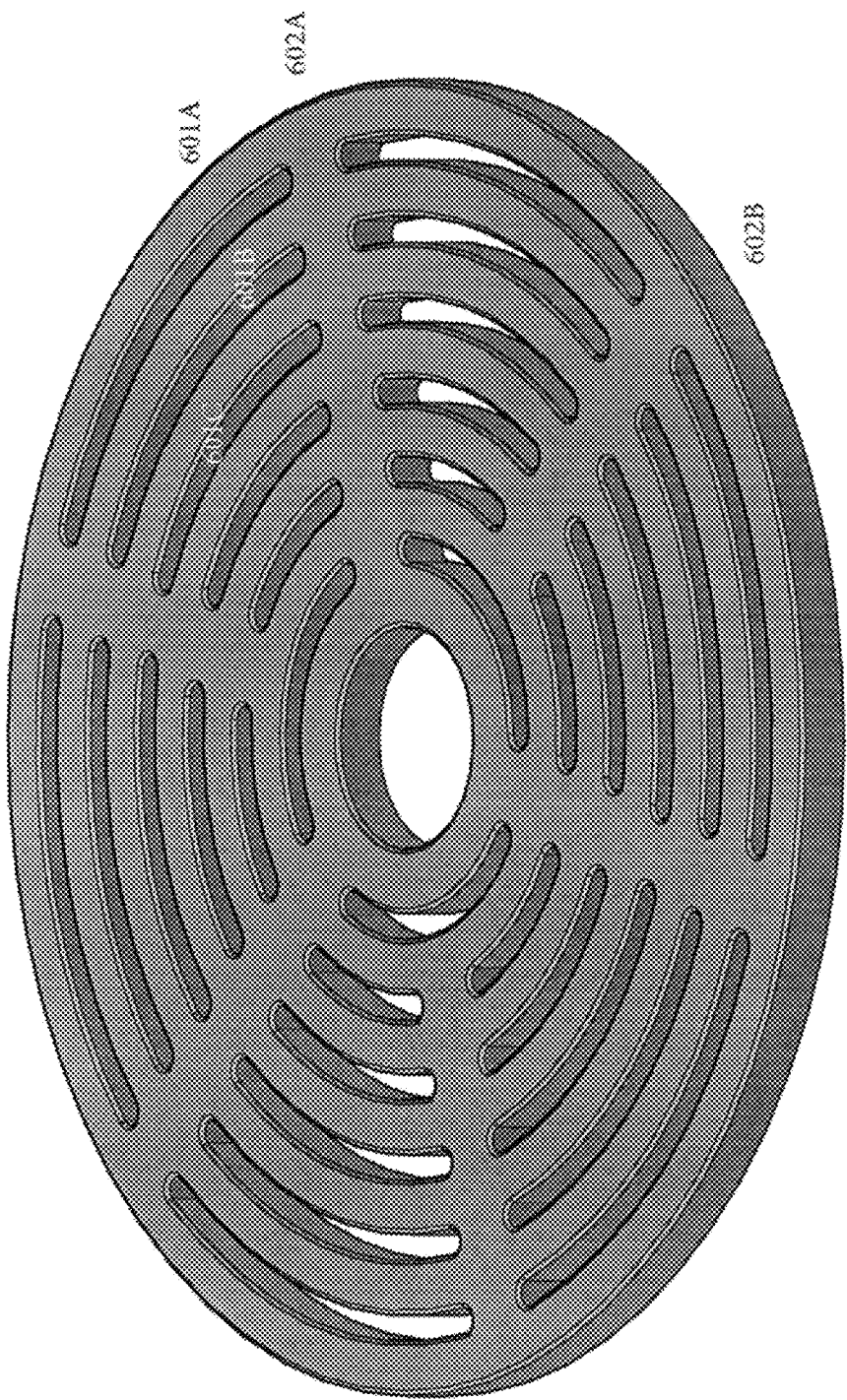
FIG. 6 illustrates a bottom view of the valve plate in an embodiment.

FIG. 6 illustrates a bottom view of the valve plate in an embodiment. The rings 701A, 702B, 703C are bisected by webs 702A, 702B, etc. The ribs and the rings are of coplanar in this embodiment. The valve plate does not have spring guides in the embodiment of FIG. 6.

Figure 7:
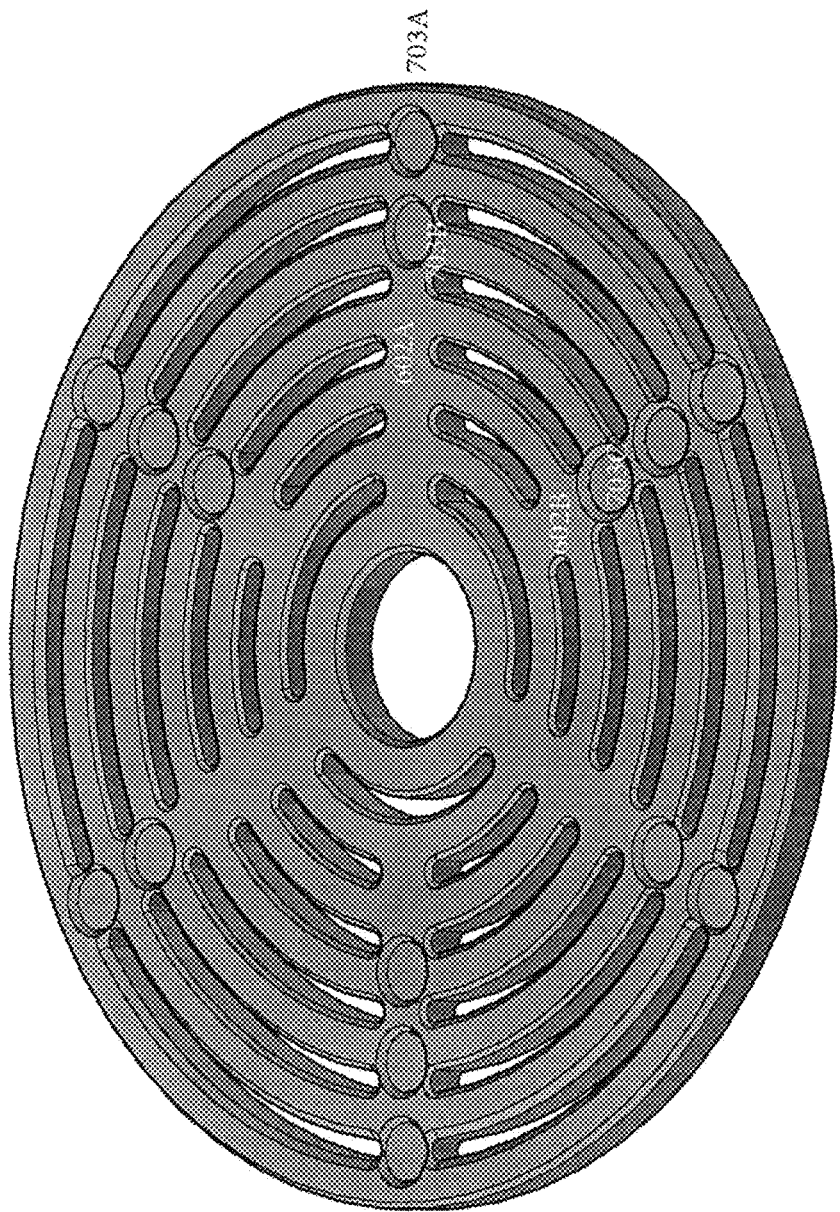
FIG. 7 illustrates a bottom view of the valve plate with spring pockets in an embodiment.

FIG. 7 illustrates a bottom view of the valve plate in an embodiment with spring guides. The spring pockets are circular depression in webs 602A and 602B, for example, and include spring pockets 703A, 703B, and 703C. The number and arrangement of the spring pockets may be varied as desired and as appropriate for the application.

Figure 8:
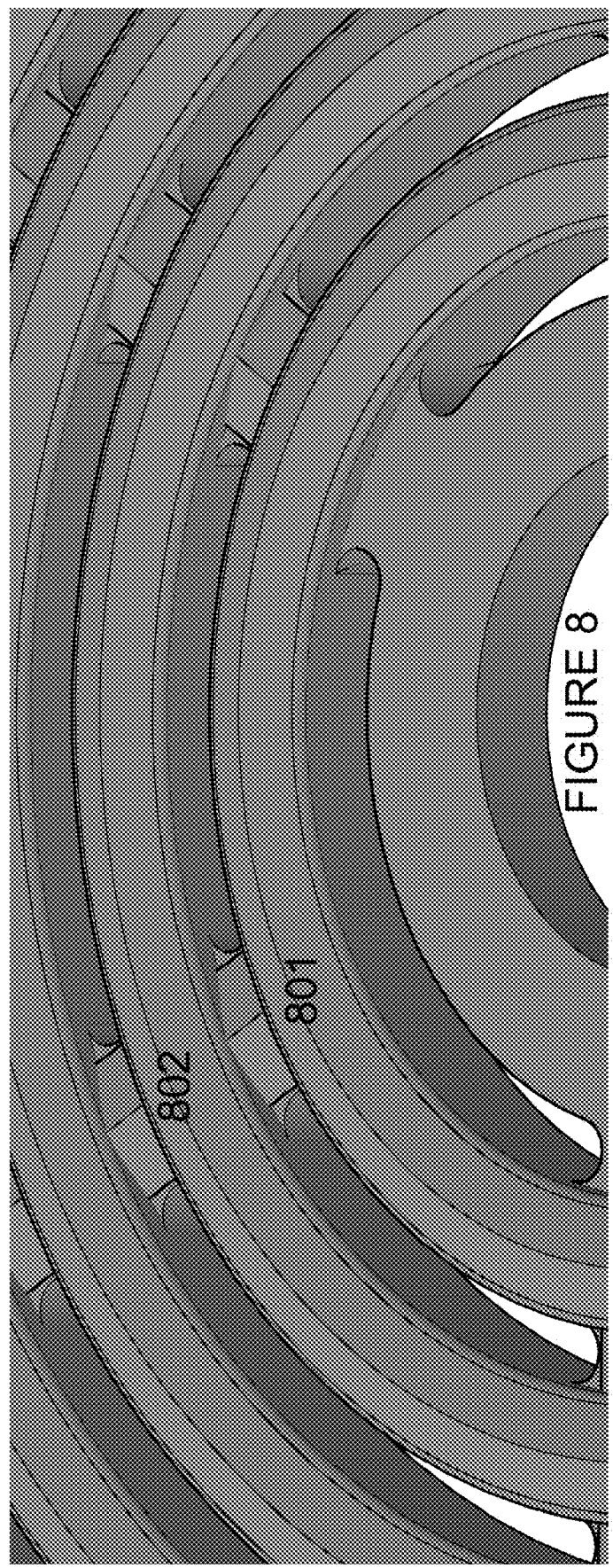
FIG. 8 illustrates a view of the webs with a V shape in an embodiment.

FIG. 8 illustrates an embodiment of the valve plate where the profile of the web segments 801 and 802, for example, are V shaped in a manner similar to the rings. This allows for improved air flow past the webs in addition to the rings, improving overall performance of the valve plate during operation.

What is claimed is:

1. A valve plate comprising:
   first and second radially spaced concentric sealing rings, each ring providing a circumferential sealing service with a valve seat;
   each sealing ring having a front face and a back face, the front face having a V-shaped profile in cross section comprising a first chamfer on a first edge and a second chamfer on a second edge, and a first sloped surface extending from the first chamfer and a second sloped surface extending from the second chamfer and meeting at a peak on the front face of each sealing ring.

2. The valve plate of claim 1 wherein the angle of the first and second sloped surface is between 82 and 85 degrees.

3. The valve plate of claim 2 wherein the peak is between 0.010 and 0.012 inches above a side edge of each sealing ring.

4. The valve plate of claim 1 wherein the plate is comprised of one of fiber-reinforced plastic, teflon, and stainless steel.

5. A valve plate comprising:
   first and second radially spaced concentric sealing rings, each ring providing a circumferential sealing service with a valve seat;
   each sealing ring having a front face and a back face, the front face defining the circumferential sealing surface, the front face having a V-shaped profile in cross section comprising a first sloped surface and a second sloped surface meeting at a peak on the front face of each sealing ring; and
   a web segment disposed between the first and second radially-spaced concentric sealing rings; the web segment having a front face facing the same direction as the front face of the sealing rings and a back face facing the same direction as the back face of the sealing rings, the front face having a V-shaped profile in cross section.

* * * * *